United States Patent
Zhang et al.

(10) Patent No.: US 11,537,624 B2
(45) Date of Patent: Dec. 27, 2022

(54) SEARCH RESULT RANKING METHOD AND DEVICE

(71) Applicant: TENCENT TECHNOLOGY (SHENZHEN) COMPANY LIMITED, Shenzhen (CN)

(72) Inventors: Lixin Zhang, Shenzhen (CN); Leyu Lin, Shenzhen (CN); Feng Xia, Shenzhen (CN); Mu Yuan, Shenzhen (CN); Xiangcong Zeng, Shenzhen (CN); Zhe Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 779 days.

(21) Appl. No.: 15/988,908

(22) Filed: May 24, 2018

(65) Prior Publication Data
US 2018/0267973 A1    Sep. 20, 2018

Related U.S. Application Data

(63) Continuation of application No. PCT/CN2017/073577, filed on Feb. 15, 2017.

(30) Foreign Application Priority Data

Feb. 27, 2016 (CN) .......................... 201610109025.4

(51) Int. Cl.
*G06F 16/2457* (2019.01)
*G06F 16/335* (2019.01)

(52) U.S. Cl.
CPC ...... *G06F 16/24578* (2019.01); *G06F 16/335* (2019.01)

(58) Field of Classification Search
CPC . G06F 16/248; G06F 16/24578; G06F 16/335
See application file for complete search history.

(56) References Cited

U.S. PATENT DOCUMENTS

| 2012/0047148 | A1* | 2/2012 | Guo ................. G06F 16/24578 |
| | | | 707/748 |
| 2015/0081688 | A1 | 3/2015 | Blass et al. |

(Continued)

FOREIGN PATENT DOCUMENTS

| CN | 102841908 A | 12/2012 |
| CN | 103034654 A | 4/2013 |

(Continued)

OTHER PUBLICATIONS

The World Intellectual Property Organization (WIPO) International Search Report for PCT/CN2017/073577 dated May 15, 2017 6 Pages (including translation).

*Primary Examiner* — Irete F Ehichioya
*Assistant Examiner* — Ken Hoang
(74) *Attorney, Agent, or Firm* — Anova Law Group, PLLC

(57) ABSTRACT

Embodiments of the present invention disclose a result ranking method and device. The method includes: acquiring search key-information by using an interaction application, and searching a prestored interaction data set for at least one search result associated with the search key-information; ranking the at least one search result according to a quality assessment score corresponding to each of the at least one search result; and outputting the ranked at least one search result. The quality assessment score corresponding to each search result is a value generated according to a number of historical operations performed on each search result and an interactive influence score of an application identifier performing a historical operation on each search result.

6 Claims, 5 Drawing Sheets

(56) References Cited

U.S. PATENT DOCUMENTS

2017/0116161 A1* 4/2017 Stein ................. G06F 16/9535
2017/0132226 A1* 5/2017 Kalis ................. G06F 16/9024

FOREIGN PATENT DOCUMENTS

| CN | 103078882 A | 5/2013 |
| CN | 103365870 A | 10/2013 |
| CN | 105808649 A | 7/2016 |

\* cited by examiner

SEARCH RESULT RANKING METHOD AND DEVICE

RELATED APPLICATIONS

This application is a continuation application of PCT Patent Application No. PCT/CN2017/073577, filed on Feb. 15, 2017, which claims priority to Chinese Patent Application No. 201610109025.4, filed with the Chinese Patent Office on Feb. 27, 2016 and entitled "SEARCH RESULT RANKING METHOD AND DEVICE", all of which are incorporated herein by reference in entirety.

FIELD OF THE TECHNOLOGY

The present application relates to the field of Internet technologies and, in particular, to a search-result ranking method and device.

BACKGROUND OF THE DISCLOSURE

With the ongoing development and improvement of Internet technologies, in existing Internet-based interactive applications, interaction data (e.g., articles, music, and pictures) can be shared between application accounts, or interaction data can be shared by using an application official account. Thus, the content diversity of interaction data is increased, and the interactivity of applications is improved.

SUMMARY

Embodiments of the present application provide a result ranking method and device, and a search result can be ranked in combination with an interactive influence of an application identifier, so that the intelligence of result ranking is improved, and the efficiency of searching interaction data is ensured.

An aspect of the present disclosure provides a result ranking method. The method includes: acquiring search key-information by using an interaction application, and searching a prestored interaction data set for at least one search result associated with the search key-information; ranking the at least one search result according to a quality assessment score corresponding to each of the at least one search result; and outputting the ranked at least one search result. The quality assessment score corresponding to each search result is a value generated according to a number of historical operations performed on each search result and an interactive influence score of an application identifier performing a historical operation on each search result.

Another aspect of the present disclosure provides a result-ranking device. The device includes a memory storing computer instructions; and a processor coupled to the memory. When executing the computer instructions, the processor is configured for: acquiring search key-information by using an interaction application, and searching a prestored interaction data set for at least one search result associated with the search key-information; ranking the at least one search result according to a quality assessment score corresponding to each of the at least one search result; and outputting the ranked at least one search result. The quality assessment score corresponding to each search result is a value generated according to a number of historical operations performed on each search result and an interactive influence score of an application identifier performing a historical operation on each search result.

Another aspect of the present disclosure provides a non-transitory computer-readable storage medium. The non-transitory computer-readable storage medium contains computer-executable instructions for, when executed by one or more processors, performing a result ranking method. The method includes: acquiring search key-information by using an interaction application, and searching a prestored interaction data set for at least one search result associated with the search key-information; ranking the at least one search result according to a quality assessment score corresponding to each of the at least one search result; and outputting the ranked at least one search result. The quality assessment score corresponding to each search result is a value generated according to a number of historical operations performed on each search result and an interactive influence score of an application identifier performing a historical operation on each search result.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present invention, the following briefly describes the accompanying drawings for describing the embodiments. Apparently, the accompanying drawings in the following description show only some embodiments of the present application, and a person of ordinary skill in the art may derive other drawings from these accompanying drawings without creative efforts, which shall also be within the scope of the present disclosure.

DETAILED DESCRIPTION

Figure 1:
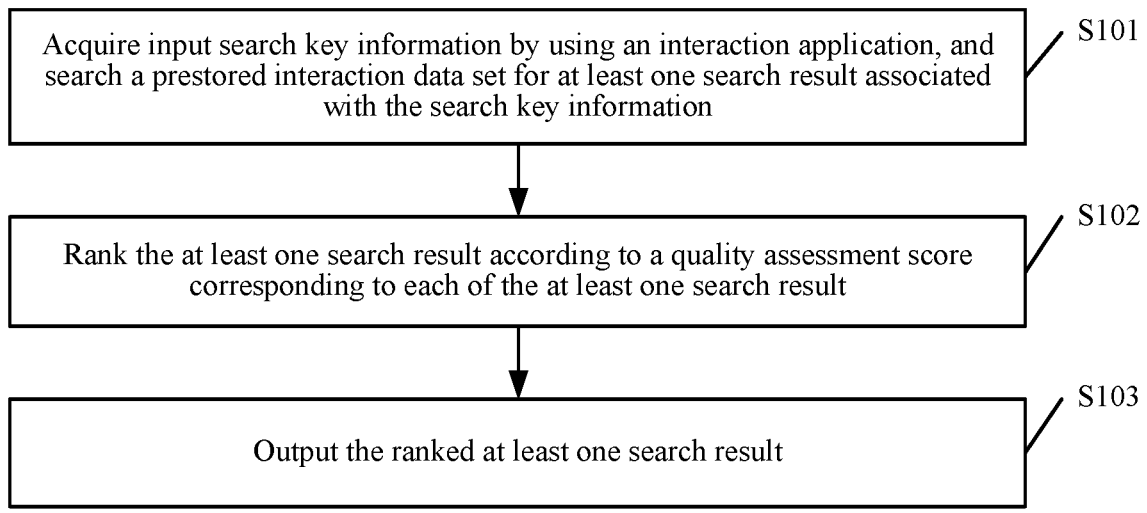
FIG. 1 illustrates a schematic flowchart of a result ranking method according to an embodiment of the present application.

The following describes the technical solutions in the embodiments of the present invention with reference to the accompanying drawings. Apparently, the described embodiments are merely some of the embodiments of the present application rather than all of the embodiments. All other embodiments obtained by a person of ordinary skill in the art based on the embodiments of the present invention without creative efforts shall fall within the protection scope of the present invention.

When a user uses a keyword to search for interaction data, search results are ranked according to the number of historical operations performed on each search result, for example, the number of times each search result has been read, forwarded, liked, and/or bookmarked.

A result ranking method, for example, a search result ranking method, provided in the disclosed embodiments may be applied to a scenario of searching for interaction data based on an interaction application. For example, a result-ranking device acquires input search key-information by using an interaction application, and searches an interaction data set for at least one search result associated with the search key-information. The result-ranking device ranks the at least one search result according to a quality assessment score corresponding to each of the at least one search result. The result-ranking device outputs the ranked at least one search result, and uses a quality assessment score of a search result to rank and output at least one search result found in the interaction data set, where the quality assessment score is generated according to the number of historical operations performed on the search result and an interactive influence score of an application identifier associating the search result. Because an influence of an application identifier during interaction is considered, a quality assessment score of a search result is measured according to the dimension of interaction executed by an application identifier, the effect of an interactive influence of the application identifier on the search result, and the like, so that the quality of the search result is optimized, the intelligence of result ranking is improved, and the efficiency of searching interaction data is further ensured.

The result-ranking device involved in the disclosed embodiments may be a back-end service device of an interaction application, and has, among other functions, the functions of keeping relationships (for example, friend relationships in an online social networking application) among multiple application identifiers in the interaction application, storing an interaction data set including at least one piece of interaction data, and processing a data request from a user terminal that has logged in to the interaction application. The user terminal may be a terminal device that can run the interaction application, including a tablet computer, a smartphone, a handheld computer, an in-vehicle terminal or a mobile Internet device (MID). The interaction application may be an instant messaging application that can implement the function of chats and interactions between application identifiers as well as the functions of browsing, searching for, and sharing interaction data, among other functions. In an embodiment, an application identifier may be used to represent one interaction application. Based on the interaction application, when relationships are established between one application identifier and multiple other application identifiers, these application identifiers in relationships may form one interaction circle. The application identifier shares interaction data, and a user may use the application identifier in the interaction circle to browse or forward the interaction data. The application identifier may be used to search for interaction data posted by the interaction application. For example, the interaction data posted in the interaction application includes: interaction data created by an application official account, interaction data forwarded between user identifiers, and the like. The interaction data may be stored in the interaction data set.

Result ranking methods provided in the disclosed embodiments are described below in detail with reference to FIG. 1 and FIG. 2.

Referring to FIG. 1, FIG. 1 is a schematic flowchart of a result ranking method according to one embodiment. As shown in FIG. 1, the method in this embodiment may include S101 to S103.

S101: Acquiring input search key-information by using an interaction application, and search an interaction data set for at least one search result associated with the search key-information.

Specifically, a user terminal may use the interaction application to acquire search key-information inputted by a user in the interaction application, and send the search key-information to a result-ranking device. The search key-information may include: a target search keyword, a key field, a key character, and the like. The user terminal sends the search key field inputted by the user to the result-ranking device. The result-ranking device receives the search key-information sent by the user terminal. The result-ranking device may search the interaction data set for at least one search result associated with the search key-information. The search result is, for example, an article, music, a picture or the like including the search key-information.

It should be noted that the interaction data set includes one or more pieces of interaction data posted by the interaction application. The interaction data is, for example, created interaction data, and forwarded interaction data. The interaction data may be an article, music, a picture, and the like. When a search is made, found interaction data is referred to as a search result.

S102: Ranking the at least one search result according to a quality assessment score corresponding to each of the at least one search result.

Specifically, the result-ranking device may rank the at least one search result according to a quality assessment score corresponding to each of the at least one search result. The quality assessment score corresponding to each search result is a value generated according to the number of historical operations performed on each search result, that is, a recorded total number of operations performed on the search result, and an interactive influence score of an application identifier associating each search result.

A historical operation represents an operation performed on interaction data within a preset time period in the past, and may include an association operation and a browsing operation. When being used as interaction data, each search result may have an association operation and a browsing operation. When a user browses the interaction data with the user terminal, the result-ranking device records one browsing operation performed on the interaction data. Alternatively, when a user forwards the interaction data with the user terminal, the result-ranking device records one association operation performed on the interaction data. The result-ranking device may record an application identifier of an interaction application that browses the interaction data and an interactive influence score of the application identifier, and record an application identifier of an interaction application that associates the interaction data and an interactive influence score of the application identifier. Eventually, a quality assessment score corresponding to the interaction data is calculated according to the number of browsing operations performed on the interaction data, the number of association operations performed on the interaction data, interactive influence scores of application identifiers of the browsing operations, and interactive influence scores of application identifiers of the association operations. When the interaction data is found as a search result, the quality assessment score of the search result is invoked to perform ranking.

S103: Outputting the ranked at least one search result.

Specifically, the result-ranking device may output the ranked at least one search result. The ranked at least one search result may be sent to the user terminal for output and display.

Accordingly, a quality assessment score of a search result is generated in combination with the number of historical operations performed on the search result and an interactive influence score of an application identifier associating the search result, and the quality assessment score is used to rank and output at least one search result found in an interaction data set. Because an influence of an application identifier during interaction is considered, a quality assessment score of a search result is measured according to the dimension of interaction executed by an application identifier, the effect of an interactive influence of the application identifier on the search result, and the like, so that the quality of the search result is optimized, the intelligence of result ranking is improved, and the efficiency of searching interaction data is further ensured.

Figure 2:
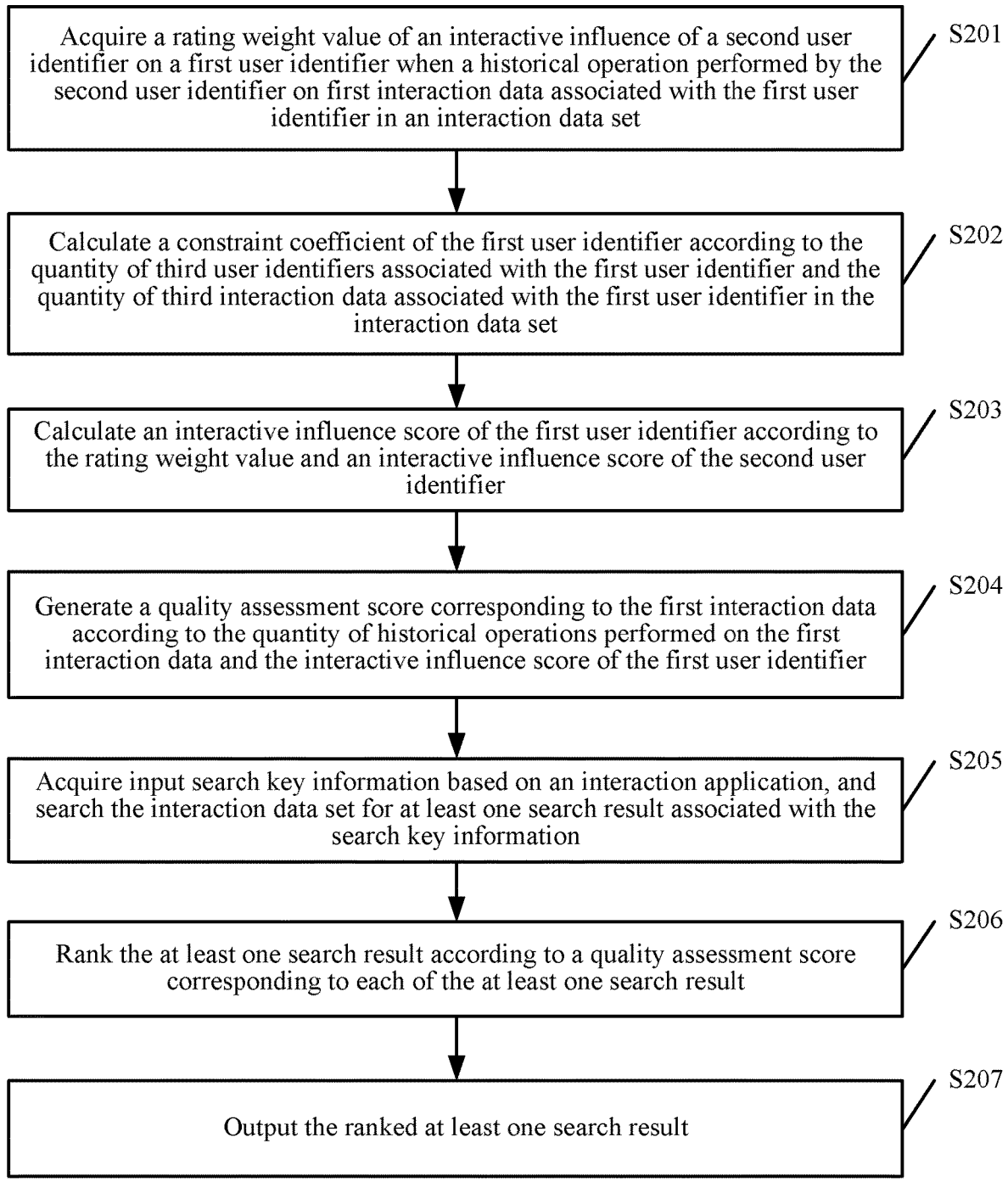
FIG. 2 illustrates a schematic flowchart of a result ranking method according to an embodiment of the present application.

Referring to FIG. 2, FIG. 2 is a schematic flowchart of a result ranking method. As shown in FIG. 2, the method may include the S201 to S207.

S201: Acquiring a rating weight value of an interactive influence of a second user identifier on a first user identifier when the second user identifier performs a historical operation on first interaction data associated with the first user identifier in an interaction data set.

Specifically, in an interaction application, when a user uses the second user identifier to perform a historical operation on the first interaction data associated with the first user identifier in the interaction data set, the historical operation represents an operation performed on interaction data within a preset historical time period, and may include an association operation and a browsing operation. A result-ranking device may acquire the rating weight value of the interactive influence of the second user identifier on the first user identifier. For a browsing operation, when another user browses interaction data shared by a current user, it does not necessarily mean that another user agrees with the opinion of the current user on the interaction data. In considering this, a browsing operation is not used in the calculation of an interactive influence score of the first user identifier.

For an association operation, when the user uses the second user identifier to perform the association operation on the first interaction data associated with the first user identifier in the interaction data set, it may represent that another user forwards the interaction data shared by the current user, and it indicates that another user agrees with the opinion of the current user on the interaction data. This is equivalent to that another user rates the current user. The result-ranking device may acquire the number of second interaction data associated with the second user identifier in the interaction data set and the number of the first interaction data on which the second user identifier performs the association operation. The first user identifier represents a user identifier that is associated with interaction data on which the association operation is performed.

That is, another user uses another user identifier to perform the association operation on the first user identifier. The second user identifier is a user identifier that performs the association operation on the interaction data. The first interaction data represents one or more pieces of interaction data that is of all interaction data associated with the first user identifier and on which the second user identifier performs the association operation, that is, one or more pieces of interaction data that are shared by the first user identifier and are forwarded by the second user by using the second user identifier. The second interaction data represents one or more pieces of interaction data associated with the second user identifier in the interaction data set, that is, one or more pieces of interaction data forwarded by the second user identifier.

The result-ranking device calculates the rating weight value of the interactive influence of the second user identifier on the first user identifier according to the number of the first interaction data and the number of the second interaction data. Assuming that the weight represents the rating weight value of the interactive influence of the second user identifier on the first user identifier, the weight can be calculated as:

weight=number of the first interaction data/number of the second interaction data    (Formula 1)

Multiple second user identifiers perform an association operation on the first interaction data of the first user identifier. Therefore, a rating weight value of an interactive influence of each second user identifier on the first user identifier needs to be separately calculated.

It should be noted that the interaction data set includes one or more pieces of interaction data posted by the interaction application. The interaction data may be created interaction data, forwarded interaction data, and the like. The interaction data may be an article, music, a picture, and the like.

S202: Calculating a constraint coefficient of the first user identifier according to the number of third user identifiers associated with the first user identifier and the number of third interaction data associated with the first user identifier in the interaction data set.

Specifically, the result-ranking device may calculate a constraint coefficient of the first user identifier according to the number of third user identifiers associated with the first user identifier and the number of third interaction data associated with the first user identifier in the interaction data set. The third user identifier is one or more user identifiers associated with the first user identifier in advance, that is, one or more user identifiers having a friend relationship with the first user identifier. The second user identifier may be included in the third user identifier. The third interaction data is one or more pieces of interaction data associated with the first user identifier in the interaction data set, that is, one or more pieces of interaction data shared by the first user identifier. It is considered that an interactive influence score of a user depends on the number of interaction data shared by the user and the number of friends of the user. That is, when a user shares more interaction data and has more friends, the user is more likely to obtain more ratings. To avoid malicious acquiring of ratings, the constraint coefficient may be used as restriction. Assuming that the constraint coefficient of the first user identifier is $\beta$, $\beta$ can be calculated as:

$\beta=1/(\log_\lambda$ number of the third user identifiers*$\log_\mu$ number of the third interaction data),    (Formula 2), where $\lambda$ and $\mu$ are both adjustment coefficients.

S203: Calculating an interactive influence score of the first user identifier according to the rating weight value and an interactive influence score of the second user identifier.

Specifically, the result-ranking device may calculate an interactive influence score of the first user identifier according to the rating weight value and an interactive influence score of the second user identifier. Further, the result-ranking device may calculate the interactive influence score of the first user identifier according to the rating weight value, the constraint coefficient of the first user identifier, and the interactive influence score of the second user identifier. Assuming that the interactive influence score of the first user identifier is PR(u), and the interactive influence score of the second user identifier is PR(v), the relationship between which can be calculated as:

$$PR(u)=(1-d)+d*\Sigma_{v\in B(u)}PR(v)*\text{weight}*\beta, \quad \text{(Formula 3)}$$

where B(u) represents a set of second user identifiers, d is a damping coefficient and is used to represent the weight of a rating assigned by the second user identifier to the first user identifier in the interactive influence score of the first user identifier, and (1−d) is used to represent a minimum value of the interactive influence score of the first user identifier.

It can be known according to Formula 3 that iteration operations need to be continuously performed in the calculation of the interactive influence score. That is, when there are multiple second user identifiers, Formula 3 needs to be repeatedly used to calculate the interactive influence score of the first user identifier. Similarly, the interactive influence score of the second user identifier can also be calculated by using the foregoing manner of Formula 1 to Formula 3.

S204: Generating a quality assessment score corresponding to the first interaction data according to the number of historical operations performed on the first interaction data and the interactive influence score of the first user identifier.

Specifically, the result-ranking device may generate a quality assessment score corresponding to the first interaction data according to the number of historical operations performed on the first interaction data and the interactive influence score of the first user identifier. Assuming that $doc_j$ represents the first interaction data, it can be calculated as:

$$doc_j = \varepsilon * 1/Nj * \sum_{i=1}^{Nj} PR(i) + \theta * 1/Mj * \sum_{i=1}^{Mj} PR(i), \quad \text{(Formula 4)}$$

where $\varepsilon$ and $\theta$ are both adjustment coefficients, $N_j$ represents the number of user identifiers performing a browsing operation on $doc_j$, that is, the number of times $doc_j$ is browsed, and $M_j$ represents the number of user identifiers performing an association operation on $doc_j$, that is, the number of times $doc_j$ is forwarded. The result-ranking device needs to further determine whether the interactive influence score of the first user identifier is in a normal threshold range, so as to ensure the reliability of a quality assessment score corresponding to interaction data.

S205: Acquiring input search key-information based on an interaction application, and search the interaction data set for at least one search result associated with the search key-information.

Specifically, the result-ranking device acquires input search key-information based on an interaction application. A user terminal may use the interaction application to acquire search key-information inputted by a user. The search key-information may be a target search keyword, a key field, a key character, and the like. The user terminal sends a search key field input by the user to the result-ranking device. The result-ranking device receives the search key-information sent by the user terminal. The result-ranking device may search the interaction data set for at least one search result associated with the search key-information. The search result is, for example, an article, music or a picture including the search key-information. It should be noted that found interaction data is referred to as a search result.

S206: Ranking the at least one search result according to a quality assessment score corresponding to each of the at least one search result.

Specifically, the result-ranking device may rank the at least one search result according to a quality assessment score corresponding to each of the at least one search result. The quality assessment score corresponding to each search result is a value generated according to the number of historical operations performed on each search result and an interactive influence score of an application identifier associating each search result.

When being used as interaction data, each search result may have an association operation and a browsing operation. When a user browses the interaction data with the user terminal, the result-ranking device records one browsing operation performed on the interaction data. Alternatively, when a user forwards the interaction data with the user terminal, the result-ranking device records one association operation performed on the interaction data. Meanwhile, the result-ranking device may record an application identifier that browses the interaction data and an interactive influence score of the application identifier, and record an application identifier that associates the interaction data and an interactive influence score of the application identifier. Eventually, a quality assessment score corresponding to the interaction data is calculated according to the number of browsing operations performed on the interaction data, the number of association operations performed on the interaction data, interactive influence scores of application identifiers of the browsing operations, and interactive influence scores of application identifiers of the association operations. When the interaction data is found as a search result, the quality assessment score of the search result is invoked to perform ranking.

S207: Outputting the ranked at least one search result.

Specifically, the result-ranking device may output the ranked at least one search result. The ranked at least one search result may be sent to the user terminal for output and display.

Thus, in one embodiment, a quality assessment score of a search result is generated in combination with the number of historical operations performed on the search result and an interactive influence score of an application identifier associating the search result, and the quality assessment score is used to rank and output at least one search result found in an interaction data set. Because an influence of an application identifier during interaction is considered, a quality assessment score of a search result is measured according to the dimension of interaction executed by an application identifier, the effect of an interactive influence of the application identifier on the search result, and the like, so that the quality of the search result is optimized, the intelligence of result ranking is improved, and the efficiency of searching interaction data is further ensured. A quality assessment score of interaction data is specifically calculated in advance by using association operations performed on the interaction data by user identifiers in combination with rating weight values of the user identifiers, interactive influence scores of the user identifiers, the number of browsing operations performed on the interaction data, and the number of association operations performed on the interaction data, so that the efficiency of subsequent ranking of a search result is improved. A constraint coefficient is added to constrain an interactive influence score of a user identifier, and a normal threshold range is added to determine an interactive influence score, so that malicious acquiring of ratings can be avoided, ensuring the objectivity of a quality assessment score.

In the embodiments provided in the present application, a search result is ranked in combination with the number of historical operations performed on the search result. When the number of historical operations performed on the search result is larger, it indicates that the number of times the search result is processed, for example, stored or read, is larger. Therefore, there are more records about the search result, and the search result can be more likely found and is therefore usually ranked at a position near the top. In addition, when the number of historical operations performed on the search result is larger, it indicates that the number of times users pay attention to the search result is larger. If the search result is ranked at the top, the number of times a user turns pages to find the search result can be reduced, and the number of information pulling operations caused by page turning is reduced, so that system and network resources and system time are saved.

In addition, a quality assessment score of a search result is calculated according to an interactive influence score of an application identifier associating the search result. The associating the search result represents that a user uses the application identifier to forward the search result. When the interactive influence score is higher, it represents that the number of times that the search result is forwarded, retrieved and recorded is larger. Therefore, during a search on a result-ranking device, the result can be found more easily, and is therefore usually ranked at a position near the top. In addition, if the number of times the search result is forwarded by users is larger and the search result is ranked at the top, the number of times a user turns pages to find the search result can be reduced, and the number of information pulling operations caused by page turning is reduced, so that system and network resources and system time are saved.

Figure 4:
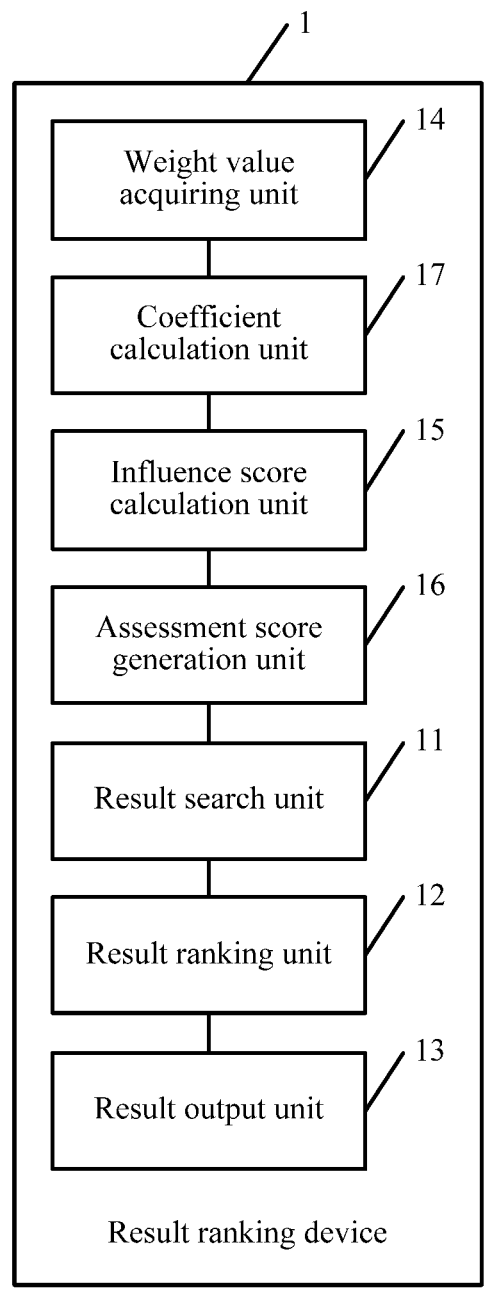
FIG. 4 illustrates a schematic diagram of a result-ranking device according to an embodiment of the present application.
Figure 5:
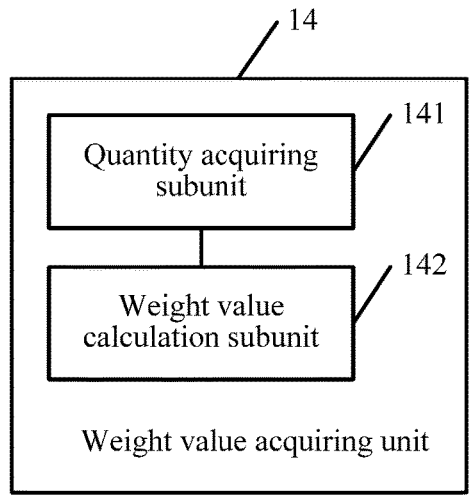
FIG. 5 illustrates a schematic diagram of a weight value acquiring unit according to an embodiment of the present application.

Result-ranking devices provided in the disclosed embodiments are described below in detail with reference to FIG. 3 to FIG. 5. It should be noted that the result-ranking devices shown in FIG. 3 to FIG. 5 are configured to perform the methods in the embodiments shown in FIG. 1 and FIG. 2 of the present application.

Figure 3:
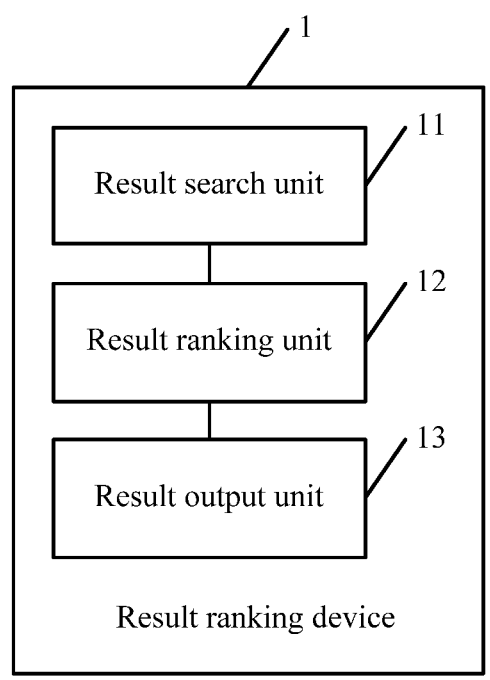
FIG. 3 illustrates a schematic diagram of a result-ranking device according to an embodiment of the present application.

Referring to FIG. 3, FIG. 3 is a schematic structural diagram of a result-ranking device. As shown in FIG. 3, a result-ranking device 1 in one embodiment may include: a result search unit 11, a result ranking unit 12, and a result output unit 13.

The result search unit 11 is configured to: acquire input search key-information by using an interaction application, and search an interaction data set for at least one search result associated with the search key-information.

During specific implementation, the result search unit 11 acquires input search key-information by using an interaction application. A user terminal may acquire search key-information input by a user based on the interaction application. The search key-information may be a target search keyword, a key field, a key character, and the like. The user terminal sends the search key field inputted by the user to the result-ranking device 1, the result search unit 11 receives the search key-information sent by the user terminal. The result search unit 11 may search the interaction data set for at least one search result associated with the search key-information. The search result is, for example, an article, music or a picture including the search key-information.

It should be noted that the interaction data set includes one or more pieces of interaction data posted by the interaction application and one or more pieces of interaction data presented by using the interaction application. The interaction data may be created interaction data, forwarded interaction data, and the like. The interaction data may be an article, music, a picture, and the like. When a search is made, found interaction data is referred to as a search result.

The result ranking unit 12 is configured to rank the at least one search result according to a quality assessment score corresponding to each of the at least one search result.

During specific implementation, the result ranking unit 12 may rank the at least one search result according to a quality assessment score corresponding to each of the at least one search result. The quality assessment score corresponding to each search result is a value generated according to the number of historical operations performed on each search result and an interactive influence score of an application identifier associating each search result.

It may be understood that a historical operation represents an operation performed on interaction data within a preset historical time period, and may include an association operation and a browsing operation. When being used as interaction data, each search result may have an association operation and a browsing operation. When a user browses the interaction data with the user terminal, the result-ranking device 1 records one browsing operation performed on the interaction data. Alternatively, when a user forwards the interaction data with the user terminal, the result-ranking device 1 records one association operation performed on the interaction data. Meanwhile, the result-ranking device 1 may record an application identifier that browses the interaction data and an interactive influence score of the application identifier, and record an application identifier that associates the interaction data and an interactive influence score of the application identifier. Eventually, a quality assessment score corresponding to the interaction data is calculated according to the number of browsing operations performed on the interaction data, the number of association operations performed on the interaction data, interactive influence scores of application identifiers of the browsing operations, and interactive influence scores of application identifiers of the association operations. When the interaction data is found as a search result, the result ranking unit 12 invokes the quality assessment score of the search result to perform ranking.

The result output unit 13 is configured to output the ranked at least one search result. The result output unit 13 may output the ranked at least one search result. The ranked at least one search result may be sent to the user terminal for output and display.

Accordingly, a quality assessment score of a search result is generated in combination with the number of historical operations performed on the search result and an interactive influence score of an application identifier associating the search result, and the quality assessment score is used to rank and output at least one search result found in an interaction data set. Because an influence of an application identifier during interaction is considered, a quality assessment score of a search result is measured according to the dimension of interaction executed by an application identifier, the effect of an interactive influence of the application identifier on the search result, and the like, so that the quality of the search result is optimized, the intelligence of result ranking is improved, and the efficiency of searching interaction data is further ensured.

Referring to FIG. 4, FIG. 4 is a schematic structural diagram of another result-ranking device. As shown in FIG. 4, a result-ranking device 1 in one embodiment may include: a result search unit 11, a result ranking unit 12, a result output unit 13, a weight value acquiring unit 14, an influence score calculation unit 15, an assessment score generation unit 16, and a coefficient calculation unit 17.

The weight value acquiring unit 14 is configured to acquire a rating weight value of an interactive influence of a second user identifier on a first user identifier when the second user identifier performs a historical operation on first interaction data associated with the first user identifier in an interaction data set.

During specific implementation, in an interaction application, when the second user identifier performs a historical operation on the first interaction data associated with the first user identifier in the interaction data set, the historical operation represents an operation performed on interaction data within a preset historical time period, and may include an association operation and a browsing operation. The weight value acquiring unit 14 may acquire the rating weight value of the interactive influence of the second user identifier on the first user identifier. For a browsing operation, when another user browses interaction data shared by a current user, it does not necessarily mean that the another user agrees with the opinion of the current user on the interaction data. In consideration of this, a browsing operation is not used in the calculation of an interactive influence score of the first user identifier. For the association operation, when the second user identifier performs the association operation on the first interaction data associated with the first user identifier in the interaction data set, it may represent that another user forwards the interaction data shared by the current user, and it indicates that another user agrees with the opinion of the current user on the interaction data. This is equivalent to that the another user rates the current user.

The weight value acquiring unit 14 may acquire the number of second interaction data associated with the second user identifier in the interaction data set and the number of the first interaction data on which the second user identifier performs the association operation. The first user identifier represents a user identifier that is associated with interaction data on which the association operation is performed. The second user identifier represents a user identifier that performs the association operation on the interaction data. The first interaction data represents one or more pieces of interaction data that is of all interaction data associated with the first user identifier and on which the second user identifier performs the association operation, that is, one or more pieces of interaction data that are shared by the first user identifier and are forwarded by the second user identifier. The second interaction data represents one or more pieces of interaction data associated with the second user identifier in the interaction data set, that is, one or more pieces of interaction data forwarded by the second user identifier.

The weight value acquiring unit 14 calculates the rating weight value of the interactive influence of the second user identifier on the first user identifier according to the number of the first interaction data and the number of the second interaction data. Assuming that the weight represents the rating weight value of the interactive influence of the second user identifier on the first user identifier, Formula 1 is: weight=the number of the first interaction data/the number of the second interaction data. Multiple second user identifiers perform an association operation on the first interaction data of the first user identifier. Therefore, a rating weight value of an interactive influence of each second user identifier on the first user identifier needs to be separately calculated.

It should be noted that the interaction data set includes one or more pieces of interaction data posted by the interaction application. The interaction data may be created interaction data, forwarded interaction data, and the like. The interaction data may be an article, music, a picture, and the like.

Specifically, referring to FIG. 5 together, FIG. 5 is a schematic structural diagram of the weight value acquiring unit provided in an embodiment. As shown in FIG. 5, the weight value acquiring unit 14 may include a quantity acquiring subunit 141 and a weight value calculation subunit 142.

The quantity acquiring subunit 141 is configured to acquire the number of second interaction data associated with a second user identifier in an interaction data set and the number of first interaction data on which the second user identifier performs an association operation when the second user identifier performs the association operation on the first interaction data associated with a first user identifier in the interaction data set.

During specific implementation, in an interaction application, when the second user identifier performs a historical operation on the first interaction data associated with the first user identifier in the interaction data set, the historical operation represents an operation performed on interaction data within a preset historical time period, and may include an association operation and a browsing operation. For a browsing operation, when another user browses interaction data shared by a current user, it does not necessarily mean that the another user agrees with the opinion of the current user on the interaction data. In consideration of this, a browsing operation is not used in the calculation of an interactive influence score of the first user identifier. For an association operation, when the second user identifier performs the association operation on the first interaction data associated with the first user identifier in the interaction data set, it may represent that another user forwards the interaction data shared by the current user, and it indicates that another user agrees with the opinion of the current user on the interaction data. This is equivalent to that the another user rates the current user.

The quantity acquiring subunit 141 may acquire the number of second interaction data associated with the second user identifier in the interaction data set and the number of the first interaction data on which the second user identifier performs the association operation. The first user identifier represents a user identifier that is associated with interaction data on which the association operation is performed. The second user identifier represents a user identifier that performs the association operation on the interaction data. The first interaction data represents one or more pieces of interaction data that are of all interaction data associated with the first user identifier and on which the second user identifier performs the association operation, that is, one or more pieces of interaction data that are shared by the first user identifier and are forwarded by the second user identifier. The second interaction data represents one or more pieces of interaction data associated with the second user identifier in the interaction data set, that is, one or more pieces of interaction data forwarded by the second user identifier.

The weight value calculation subunit 142 is configured to calculate the rating weight value of the interactive influence of the second user identifier on the first user identifier according to the number of the first interaction data and the number of the second interaction data.

During specific implementation, the weight value calculation subunit 142 calculates the rating weight value of the interactive influence of the second user identifier on the first user identifier according to the number of the first interaction data and the number of the second interaction data. Assuming that the weight represents the rating weight value of the interactive influence of the second user identifier on the first user identifier, Formula 1 is: weight=the number of the first interaction data/the number of the second interaction data. Multiple second user identifiers perform an association operation on the first interaction data of the first user identifier. Therefore, a rating weight value of an interactive influence of each second user identifier on the first user identifier needs to be separately calculated.

The coefficient calculation unit 17 is configured to calculate a constraint coefficient of the first user identifier according to the number of third user identifiers associated with the first user identifier and the number of third interaction data associated with the first user identifier in the interaction data set.

During specific implementation, the coefficient calculation unit 17 may calculate a constraint coefficient of the first user identifier according to the number of third user identifiers associated with the first user identifier and the number of third interaction data associated with the first user identifier in the interaction data set. The third user identifier represents one or more user identifiers associated with the first user identifier in advance, that is, one or more user identifiers having a friend relationship with the first user identifier. It may be understood that, the second user identifier may be included in the third user identifier. The third interaction data represents one or more pieces of interaction data associated with the first user identifier in the interaction data set, that is, one or more pieces of interaction data shared by the first user identifier. It is considered that an interactive influence score of a user depends on the number of interaction data shared by the user and the number of friends of the user. That is, when a user shares more interaction data and has more friends, the user is more likely to obtain more ratings. To avoid malicious acquiring of ratings, the constraint coefficient may be used for restriction. Assuming that the constraint coefficient of the first user identifier is β, Formula 2 is: β=1/(log$_\lambda$ the number of the third user identifiers*log$_\mu$ the number of the third interaction data), where λ and μ are both adjustment coefficients.

The influence score calculation unit 15 is configured to calculate an interactive influence score of the first user identifier according to the rating weight value and an interactive influence score of the second user identifier.

During specific implementation, the influence score calculation unit 15 may calculate the interactive influence score of the first user identifier according to the rating weight value and the interactive influence score of the second user identifier, Further, the influence score calculation unit 15 may calculate the interactive influence score of the first user identifier according to the rating weight value, the constraint coefficient of the first user identifier, and the interactive influence score of the second user identifier. Assuming that the interactive influence score of the first user identifier is PR(u), and the interactive influence score of the second user identifier is PR(v), Formula 3 is: PR(u)=(1−d)+d*Σ$_{v \in B(u)}$PR(v)*weight*β, where B(u) represents a set of second user identifiers, d is a damping coefficient and is used to represent the weight of a rating assigned by the second user identifier to the first user identifier in the interactive influence score of the first user identifier, and (1−d) is used to represent a minimum value of the interactive influence score of the first user identifier. It can be known according to Formula 3 that iteration operations need to be continuously performed in the calculation of the interactive influence score. That is, when there are multiple second user identifiers, Formula 3 needs to be repeatedly used to calculate the interactive influence score of the first user identifier. Similarly, the interactive influence score of the second user identifier can also be calculated by using the foregoing manner of Formula 1 to Formula 3.

The assessment score generation unit 16 is configured to generate a quality assessment score corresponding to the first interaction data according to the number of historical operations performed on the first interaction data and the interactive influence score of the first user identifier.

During specific implementation, the assessment score generation unit 16 may generate a quality assessment score corresponding to the first interaction data according to the number of historical operations performed on the first interaction data and the interactive influence score of the first user identifier. Assuming that doc$_j$ represents the first interaction data, Formula 4 is:

$$doc_j = \varepsilon * 1/N_j * \sum_{i=1}^{N_j} PR(i) + \theta * 1/M_j * \sum_{i=1}^{M_j} PR(i),$$

where ε and θ are both adjustment coefficients, N$_j$ represents the number of user identifiers performing a browsing operation on doc$_j$, that is, the number of times doc$_j$ is browsed, and M$_j$ represents the number of user identifiers performing an association operation on doc$_j$, that is, the number of times doc$_j$ is forwarded. The result-ranking device 1 needs to further determine whether the interactive influence score of the first user identifier is in a normal threshold range, to ensure the reliability of a quality assessment score corresponding to interaction data.

The result search unit 11 is configured to: acquire input search key-information based on an interaction application, and search the interaction data set for at least one search result associated with the search key-information.

During specific implementation, the result search unit 11 acquires input search key-information based on an interaction application. A user terminal may acquire search key-information input by a user based on the interaction application. The search key-information may be a target search keyword, a key field, a key character, and the like. The user terminal sends the search key field inputted by the user to the result-ranking device 1. The result search unit 11 receives the search key-information sent by the user terminal. The result search unit 11 may search the interaction data set for at least one search result associated with the search key-information. The search result is, for example, an article, music or a picture including the search key-information. It should be noted that found interaction data is referred to as a search result.

The result ranking unit 12 is configured to rank the at least one search result according to the quality assessment score corresponding to each of the at least one search result.

During specific implementation, the result ranking unit 12 may rank the at least one search result according to the quality assessment score corresponding to each of the at least one search result. The quality assessment score corresponding to each search result is a value generated according to the number of historical operations performed on each search result and an interactive influence score of an application identifier associating each search result.

When being used as interaction data, each search result may have an association operation and a browsing operation. When a user browses the interaction data with the user terminal, the result-ranking device 1 records one browsing operation performed on the interaction data. Alternatively, when a user forwards the interaction data with the user terminal, the result-ranking device 1 records one association operation performed on the interaction data. Meanwhile, the result-ranking device 1 may record an application identifier that browses the interaction data and an interactive influence score of the application identifier, and record an application identifier that associates the interaction data and an interactive influence score of the application identifier. Eventually, a quality assessment score corresponding to the interaction data is calculated according to the number of browsing operations performed on the interaction data, the number of association operations performed on the interaction data, interactive influence scores of application identifiers of the browsing operations, and interactive influence scores of application identifiers of the association operations. When the interaction data is found as a search result, the result ranking unit 12 invokes the quality assessment score of the search result to perform ranking.

The result output unit 13 is configured to output the ranked at least one search result. During specific implementation, the result output unit 13 may output the ranked at least one search result. The ranked at least one search result may be sent to the user terminal for output and display.

Accordingly, a quality assessment score of a search result is generated in combination with the number of historical operations performed on the search result and an interactive influence score of an application identifier associating the search result, and the quality assessment score is used to rank and output at least one search result found in an interaction data set. Because an influence of an application identifier during interaction is considered, a quality assessment score of a search result is measured according to the dimension of interaction executed by an application identifier, the effect of an interactive influence of the application identifier on the search result, and the like, so that the quality of the search result is optimized, the intelligence of result ranking is improved, and the efficiency of searching interaction data is further ensured. A quality assessment score of interaction data is specifically calculated in advance by using association operations performed on the interaction data by user identifiers in combination with rating weight values of the user identifiers, interactive influence scores of the user identifiers, the number of browsing operations performed on the interaction data, and the number of association operations performed on the interaction data, so that the efficiency of subsequent ranking of a search result is improved. A constraint coefficient is added to constrain an interactive influence score of a user identifier, and a normal threshold range is added to determine an interactive influence score, so that malicious acquiring of ratings can be avoided, ensuring the objectivity of a quality assessment score.

Figure 6:
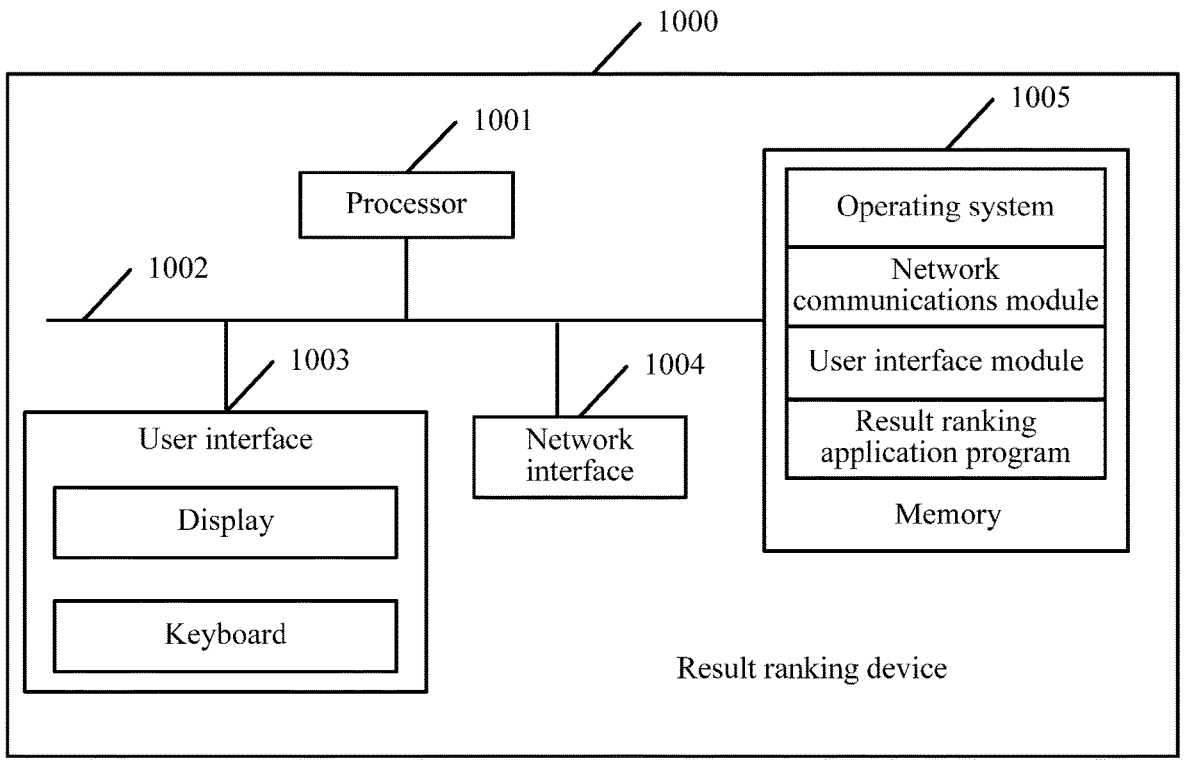
FIG. 6 illustrates a schematic structural diagram of a result-ranking device according to an embodiment of the present application.

Referring to FIG. 6, FIG. 6 is a schematic structural diagram of still another result-ranking device provided in an embodiment. As shown in FIG. 6, a result-ranking device 1000 may include: at least one processor 1001 (e.g., a CPU), at least one network interface 1004, a user interface 1003, a memory 1005, and at least one communication bus 1002. The communication bus 1002 is configured to implement connection and communication between these components. The user interface 1003 may include a display and a keyboard. Optionally, the user interface 1003 may further include a standard wired interface and a standard wireless interface. The network interface 1004 may optionally include a standard wired interface and a standard wireless interface (for example, a WI-FI interface). The memory 1005 may be a high-speed RAM or may be a non-volatile memory, for example, at least one disk memory. The memory 1005 may further optionally be at least one storage apparatus located far away from the processor 1001. As shown in FIG. 6, the memory 1005 used as a computer storage medium may include an operating system, a network communications module, a user interface module, and a result ranking application program.

In the result-ranking device 1000 shown in FIG. 6, the user interface 1003 is mainly configured to provide an input interface to a user, to acquire data inputted by the user. The network interface 1004 is mainly configured to communicate with a user terminal. The processor 1001 may be configured to invoke the result ranking application program stored in the memory 1005 and specifically perform the following operations: acquiring search key-information by using an interaction application, and searching a prestored interaction data set for at least one search result associated with the search key-information; ranking the at least one search result according to a quality assessment score corresponding to each of the at least one search result; and outputting the ranked at least one search result. Where the quality assessment score corresponding to each search result being a value generated according to the number of historical operations performed on each search result and an interactive influence score of an application identifier performing a historical operation on each search result.

In an embodiment, before the acquiring input search key-information based on an interaction application, and searching at least one search result associated with the search key-information, the processor 1001 further performs the following operations: acquiring a rating weight value of an interactive influence of a second user identifier on a first user identifier when a historical operation performed by the second user identifier on first interaction data associated with the first user identifier in the interaction data set is recorded; calculating an interactive influence score of the first user identifier according to the rating weight value and an interactive influence score of the second user identifier; and generating a quality assessment score corresponding to the first interaction data according to the number of historical operations performed on the first interaction data and the interactive influence score of the first user identifier.

In an embodiment, the historical operation includes an association operation and a browsing operation.

During the acquiring a rating weight value of an interactive influence of a second user identifier on a first user identifier when a second user identifier performs a historical operation on the first interaction data associated with the first user identifier in the interaction data set, the processor 1001 specifically performs the following operations: acquiring the number of second interaction data associated with the second user identifier in the interaction data set and the number of the first interaction data on which the second user identifier performs an association operation when the association operation performed by the second user identifier on the first interaction data associated with the first user identifier in the interaction data set is recorded; and calculating the rating weight value of the interactive influence of the second user identifier on the first user identifier according to the number of the first interaction data and the number of the second interaction data.

In an embodiment, before the calculating an interactive influence score of the first user identifier according to the rating weight value and an interactive influence score of the second user identifier, the processor 1001 further performs the following operation: calculating a constraint coefficient of the first user identifier according to the number of third user identifiers associated with the first user identifier and the number of third interaction data associated with the first user identifier in the interaction data set.

In an embodiment, during the calculating an interactive influence score of the first user identifier according to the rating weight value and an interactive influence score of the second user identifier, the processor 1001 specifically performs the following operation: calculating the interactive influence score of the first user identifier according to the rating weight value, the constraint coefficient of the first user identifier, and the interactive influence score of the second user identifier.

Accordingly, a quality assessment score of a search result is generated in combination with the number of historical operations performed on the search result and an interactive influence score of an application identifier associating the search result, and the quality assessment score is used to rank and output at least one search result found in an interaction data set. Because an influence of an application identifier during interaction is considered, a quality assessment score of a search result is measured according to the dimension of interaction executed by an application identifier, the effect of an interactive influence of the application identifier on the search result, and the like, so that the quality of the search result is optimized, the intelligence of result ranking is improved, and the efficiency of searching interaction data is further ensured. A quality assessment score of interaction data is specifically calculated in advance by using association operations performed on the interaction data by user identifiers in combination with rating weight values of the user identifiers, interactive influence scores of the user identifiers, the number of browsing operations performed on the interaction data, and the number of association operations performed on the interaction data, so that the efficiency of subsequent ranking of a search result is improved. A constraint coefficient is added to constrain an interactive influence score of a user identifier, so that malicious acquiring of ratings can be avoided, ensuring the objectivity of a quality assessment score.

A person of ordinary skill in the art may understand that all or some of the steps in the methods of the foregoing embodiments may be implemented by a computer program instructing relevant hardware. The program may be stored in a computer-readable storage medium. When the program is run, the procedures of the embodiments of the foregoing method are performed. The storage medium may be a magnetic disk, an optical disk, a Read-Only Memory (ROM), a Random Access Memory (RAM), and the like.

The foregoing descriptions are merely preferred embodiments of the present application but certainly are not intended to limit the patent scope of the present application. Therefore, equivalent variations made according to the claims of the present application still fall within the scope of the present application.

What is claimed is:

1. A result ranking method performed by a result-ranking device, the method comprising:
    running an interaction application, wherein the interaction application keeps social networking friend relationships, stores an interactive data set, implements functions of chats, implements functions of browsing, searching for, and sharing interaction data, and establishes an interaction circle for browsing or forwarding the interaction data;
    acquiring search key-information by using the interaction application, and searching the stored interaction data set for at least two search results associated with the search key-information;
    ranking the at least two search results according to a quality assessment score corresponding to each of the at least two search results; and
    outputting and displaying the at least two search results as ranked, wherein one of the at least two search results corresponding to a higher quality assessment score is displayed ahead of another of the at least two search results corresponding to a lower quality assessment score,
    wherein the quality assessment score corresponding to each of the at least two search results is a value generated according to a number of historical operations performed on the each of the at least two search results and according to an interactive influence score of a first user identifier,
    wherein the interactive influence of the first user identifier is calculated according to a rating weight value and an interactive influence score of a second user identifier performing a historical operation on the each of the at least two search results, and according to a constraint coefficient of the first user identifier,
    wherein the constraint coefficient of the first user identifier is calculated according to a number of third user identifiers associated with the first user identifier and a number of third interaction data associated with the first user identifier in the interaction data set,
    wherein the historical operations include one or both of a browsing operation and a forwarding operation performed on the each of the at least two search results, and
    wherein the rating weight value of the second user identifier is a ratio of a number of first interaction data associated with the first user identifier relative to a number of second interaction data generated by the second user identifier in response to the first interaction data.

2. The method according to claim 1, wherein:
    calculating the constraint coefficient of the first user identifier is performed prior to calculating the interactive influence score of the first user identifier.

3. A result-ranking device, comprising: a memory storing computer instructions; and a processor coupled to the memory and, when executing the computer instructions, configured for:
    running an interaction application, wherein the interaction application keeps social networking friend relationships, stores an interactive data set, implements functions of chats, implements functions of browsing, searching for, and sharing interaction data, and establishes an interaction circle for browsing or forwarding the interaction data;
    acquiring search key-information by using the interaction application, and searching the stored interaction data set for at least two search results associated with the search key-information;
    ranking the at least two search results according to a quality assessment score corresponding to each of the at least two search results; and
    outputting and displaying the at least two search results as ranked, wherein one of the at least two search results corresponding to a higher quality assessment score is displayed ahead of another of the at least two search results corresponding to a lower quality assessment score, wherein the quality assessment score corresponding to each of the at least two search results is a value generated according to a number of historical operations performed on the each of the at least two search results and according to an interactive influence score of a first user identifier, wherein the interactive influence score of the first user identifier is calculated according to a rating weight value and an interactive influence score of a second user identifier performing a historical operation on the each of the at least two search results, and according to a constraint coefficient of the first user identifier, wherein the constraint coefficient of the first user identifier is calculated according to a number of third user identifiers associated with the first user identifier and a number of third interaction data associated with the first user identifier in the interaction data set, wherein the historical operations include one or both of a browsing operation and a forwarding operation performed on the each of the at least two search results, and wherein the rating weight value of the second user identifier is a ratio of a number of first interaction data associated with the first user identifier relative to a number of second interaction data generated by the second user identifier in response to the first interaction data.

4. The result-ranking device according to claim 3, wherein calculating the constraint coefficient of the first user identifier is performed prior to calculating the interactive influence score of the first user identifier.

5. A non-transitory computer-readable storage medium containing computer-executable instructions for, when executed by one or more processors, performing a result ranking method, the method comprising:

running an interaction application, wherein the interaction application keeps social networking friend relationships, stores an interactive data set, implements functions of chats, implements functions of browsing, searching for, and sharing interaction data, and establishes an interaction circle for browsing or forwarding the interaction data;

acquiring search key-information by using the interaction application, and searching the stored interaction data set for at least two search results associated with the search key-information;

ranking the at least two search results according to a quality assessment score corresponding to each of the at least two search results; and outputting and displaying the at least two search results as ranked, wherein one of the at least two search results corresponding to a higher quality assessment score is displayed ahead of another of the at least two search results corresponding to a lower quality assessment score, wherein the quality assessment score corresponding to each of the at least two search results is a value generated according to a number of historical operations performed on the each of the at least two search results and according to an interactive influence score of a first user identifier, wherein the interactive influence score of the first user identifier is calculated according to a rating weight value and an interactive influence score of a second user identifier performing a historical operation on the each of the at least two search results, and according to a constraint coefficient of the first user identifier, wherein the constraint coefficient of the first user identifier is calculated according to a number of third user identifiers associated with the first user identifier and a number of third interaction data associated with the first user identifier in the interaction data set, wherein the historical operations include one or both of a browsing operation and a forwarding operation performed on the each of the at least two search results, and wherein the rating weight value of the second user identifier is a ratio of a number of first interaction data associated with the first user identifier relative to a number of second interaction data generated by the second user identifier in response to the first interaction data.

6. The non-transitory computer-readable storage medium according to claim 5, wherein calculating the constraint coefficient of the first user identifier is performed prior to calculating the interactive influence score of the first user identifier.

* * * * *